United States Patent [19]

Knight

[11] Patent Number: 4,728,749

[45] Date of Patent: Mar. 1, 1988

[54] UTILITY POLE ASSEMBLY

[75] Inventor: John K. Knight, Doncaster, Australia

[73] Assignee: R.F.D. Consultants Pty. Ltd., Melbourne, Australia

[21] Appl. No.: 853,022

[22] PCT Filed: Aug. 27, 1985

[86] PCT No.: PCT/AU85/00203

§ 371 Date: Apr. 17, 1986

§ 102(e) Date: Apr. 17, 1986

[87] PCT Pub. No.: WO86/01635

PCT Pub. Date: Mar. 13, 1986

[30] Foreign Application Priority Data

Sep. 3, 1984 [AU] Australia .............................. PG6896

[51] Int. Cl.[4] ........................ H02G 7/20; E04H 12/24; H01B 17/16

[52] U.S. Cl. .................................... 174/45 R; 52/697; 174/149 R; 174/168

[58] Field of Search .................... 174/40 R, 45 R, 148, 174/149 R, 168, 174, 99 R, 146, 156, 157, 166 R; 52/40, 697, 721

[56] References Cited

U.S. PATENT DOCUMENTS

| | | | |
|---|---|---|---|
| 342,324 | 5/1886 | Brandon | 174/99 R X |
| 617,062 | 1/1899 | Taliaferro | 174/149 R X |
| 809,743 | 1/1906 | Petery | 174/149 R |
| 3,207,840 | 9/1965 | Sharp | 174/148 |

FOREIGN PATENT DOCUMENTS

| | | | |
|---|---|---|---|
| 269968 | 4/1969 | Australia | 174/45 R |
| 162260 | 3/1955 | Austria | 174/149 R |
| 1590597 | 6/1970 | Fed. Rep. of Germany | 174/45 R |
| 2039167 | 6/1972 | Fed. Rep. of Germany | 174/45 R |
| 3967 | of 1883 | United Kingdom | 174/149 R |
| 171900 | 12/1921 | United Kingdom | 174/146 |
| 557746 | 12/1943 | United Kingdom | 174/175 |
| 609966 | 10/1948 | United Kingdom | 174/149 R |

*Primary Examiner*—Laramie E. Askin
*Attorney, Agent, or Firm*—Stetina and Brunda

[57] ABSTRACT

Ceramic elements which can be clamped together by means of a tension rod so as to form a cross-arm assembly for a utility pole. The elements are provided with recesses which receive electrical conductors, with clips being provided so as to retain the conductors within the recesses. The elements thus provide physical support for the conductors and also form the insulating medium for the conductors.

9 Claims, 5 Drawing Figures

Fig. 1
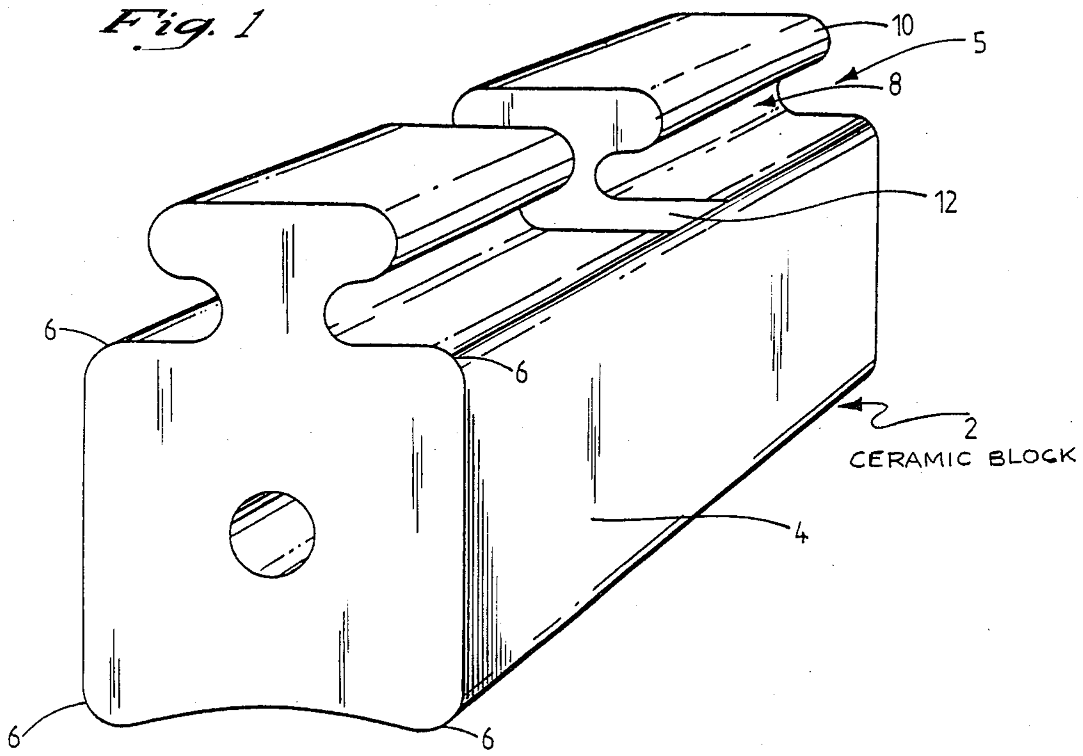
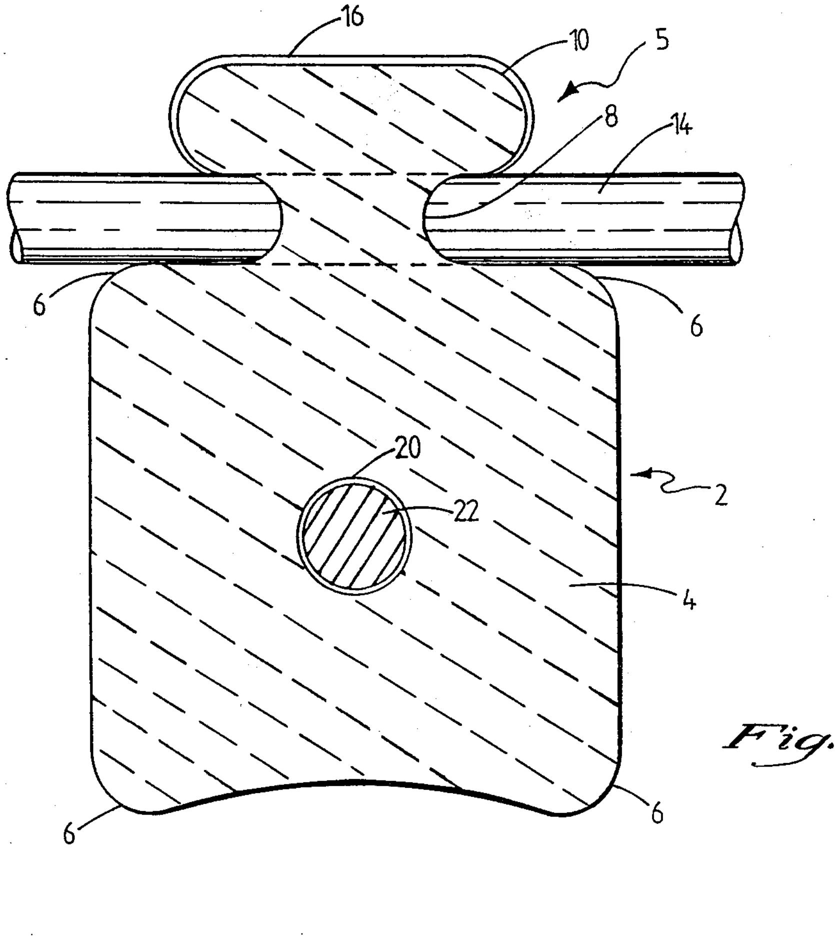
Fig. 2

UTILITY POLE ASSEMBLY

BACKGROUND OF THE INVENTION

The present invention relates to a utility pole assembly including a cross-arm which provides support for electrical conductors. In particular, the present invention relates to a utility pole assembly including a cross-arm that is both insulating and supportive.

Although the present invention will be described with particular reference to a cross-arm assembly of ceramic bricks or blocks which are manufactured from essentially non-conducting material, the scope of the present invention is not so limited and may extend to other applications of the bricks or blocks and cross-arm assembly and to other forms of the support assembly.

Cross-arms for utility poles, such as those carrying electrical conductors and insulators, are most usually made of wood and are provided with metal fittings. The wood deteriorates in time, caused by water impregnating the matrix of the wood thus destroying its structure. In addition, the wooden poles when wet or impregnated with moisture can be electrically conductive, particularly so when metal fittings are used to secure the cross-arms. Thus, existing cross-arms of power poles have at least two deficiencies, that of premature ageing and deterioration necessitating replacement at a high cost of both labor and replacement materials, and that of the unwarranted conduction of stray currents to undesirable parts of the pole assembly which presents a safety problem since it may cause shock or other injuries to operators or people in the vicinity of the poles.

Therefore, it is an aim of the present invention to at least provide a cross-arm assembly or cross-arm element which at least alleviates one of the problems of prior art cross-arms or cross-arm elements.

SUMMARY OF THE INVENTION

According to one aspect of the present invention there is provided an element suitable for use in a cross-arm assembly for a utility pole for supporting an electrical conductor in an insulated condition, in use, comprising a body portion and a top portion, said top portion being provided with conductor support means for supporting an electrical conductor in position in an insulated condition and wherein said body portion is provided with means for connecting said element to adjacent similar elements for forming said assembly.

According to another aspect of the present invention there is provided a cross-arm assembly for a utility pole for supporting at least one electrical conductor in an insulated condition, in use, comprising a plurality of similar elements of a substantially insulating material interconnected together so as to form the cross-arm, each of said elements having a body portion and a top portion, said body portion being provided with means permitting adjacent ones of the elements to be fastened together and the top portion being provided with means to support the electrical conductor, and wherein at least one of the elements is connected to the pole in use.

According to another aspect of the present invention there is provided a utility pole having at least one cross-arm assembly wherein the cross-arm assembly comprises a plurality of similar insulating elements of the form defined above.

DESCRIPTION OF THE DRAWINGS

The present invention will now be described by way of example with particular reference to the accompanying drawings in which:

FIG. 1 is a perspective view of one form of the ceramic block of the present invention;

FIG. 2 is a cross section view of the block of FIG. 1 taken along the line 2—2 of FIG. 3;

DETAILED DESCRIPTION OF THE PREFERRED EMBODIMENT

Figure 3:
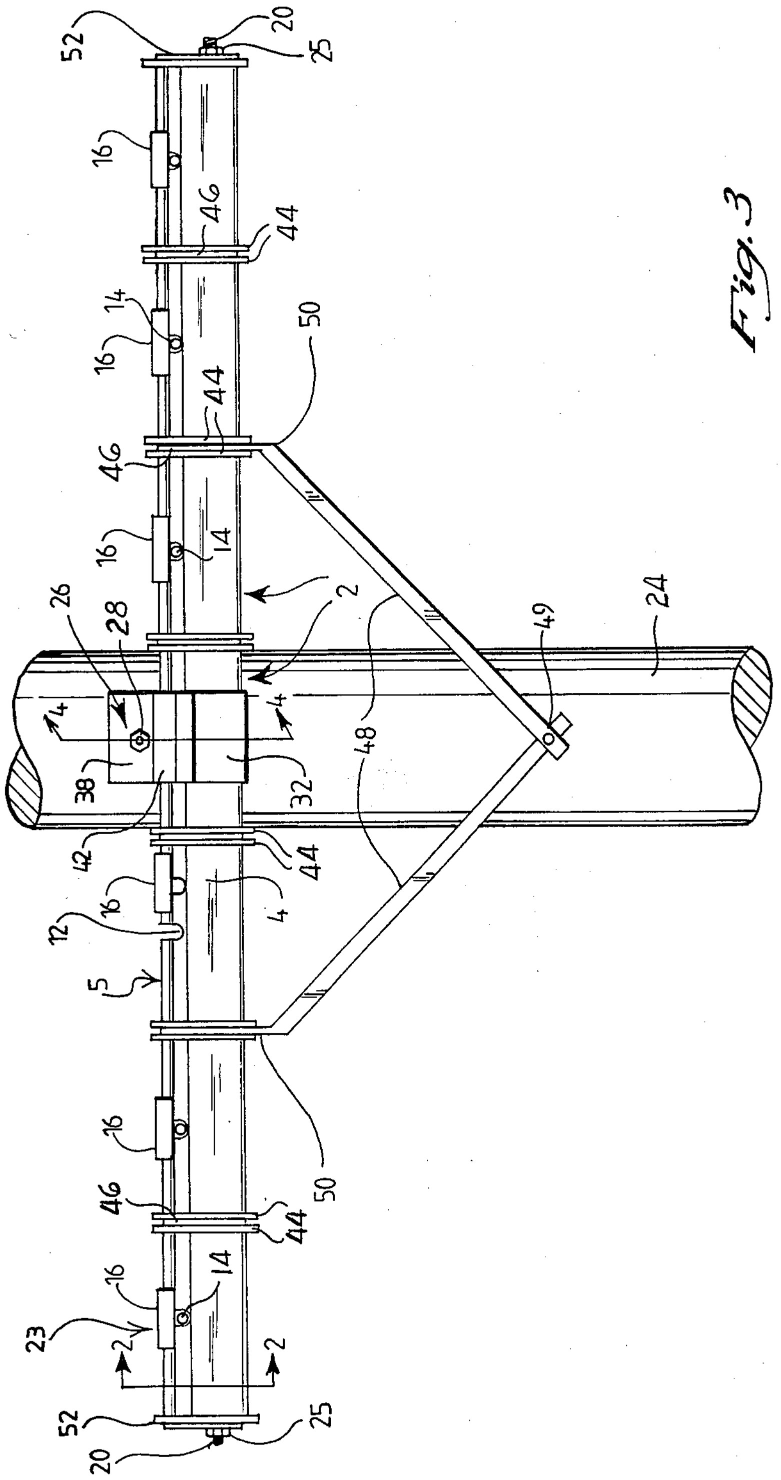
FIG. 3 is a view of a utility pole having a cross-arm assembly in accordance with the present invention.

In FIG. 1 there is shown a block 2 made of a ceramic material which is non-conductive and may be glazed or impregnated with polymer so as to be moisture- or water-proof. The composition of the ceramic block is such that even if the glaze is damaged or deteriorates, water may not ingress into the matrix of the material to any significant extent and certainly not to such an extent that substantial leakage currents may be conducted through the body of the block.

The block 2 has a base 4 being generally cuboidal in shape but having curved longitudinal edges 6. The underside of the block 2 is formed with a shallow concave recess between the edges 6 which extends in the longitudinal direction of the block. The block 2 has a curved top portion 5 having a relatively thin neck portion 8 and a relatively thicker head portion 10. The top portion 5 of the block 2 has a transversely extending straight groove 12 which extends through both the neck and head portions. In use, an electrical conductor 14, such as one of the wires of the electrical supply network, is received in the transverse groove. A slidable locking clip 16 of generally C-shaped cross-section and of complementary contour to the upper contour of the head portion 10 is located on the head portion above the groove 12. The clip 16 can be slid along the head portion so that the conductor 14 may be placed in groove 12. However, once the conductor 14 is located in the groove 12, the locking clip is slidably moved to span the groove 12 and thereby retain the electrical conductor in the groove, as shown in FIGS. 2 and 5.

The base 4 of the block has a longitudinally extending bore 20 located at or near its center for receiving a tensioning rod 22 or similar tensile member therethrough so as to secure adjacent blocks together (as will be described in more detail later). The reinforcing rod or tensile member is preferably coated or provided with suitable surface coating or plastic insulating sleeve so that in the event that water enters the central bore 20, the rod 22 will not conduct electricity. Further the coated rod will not undergo electrolysis reactions, such as rust or other corrosive mechanisms, which would tend to cause deterioration thereof and thus loosen the cross-arm assembly.

Figure 4:
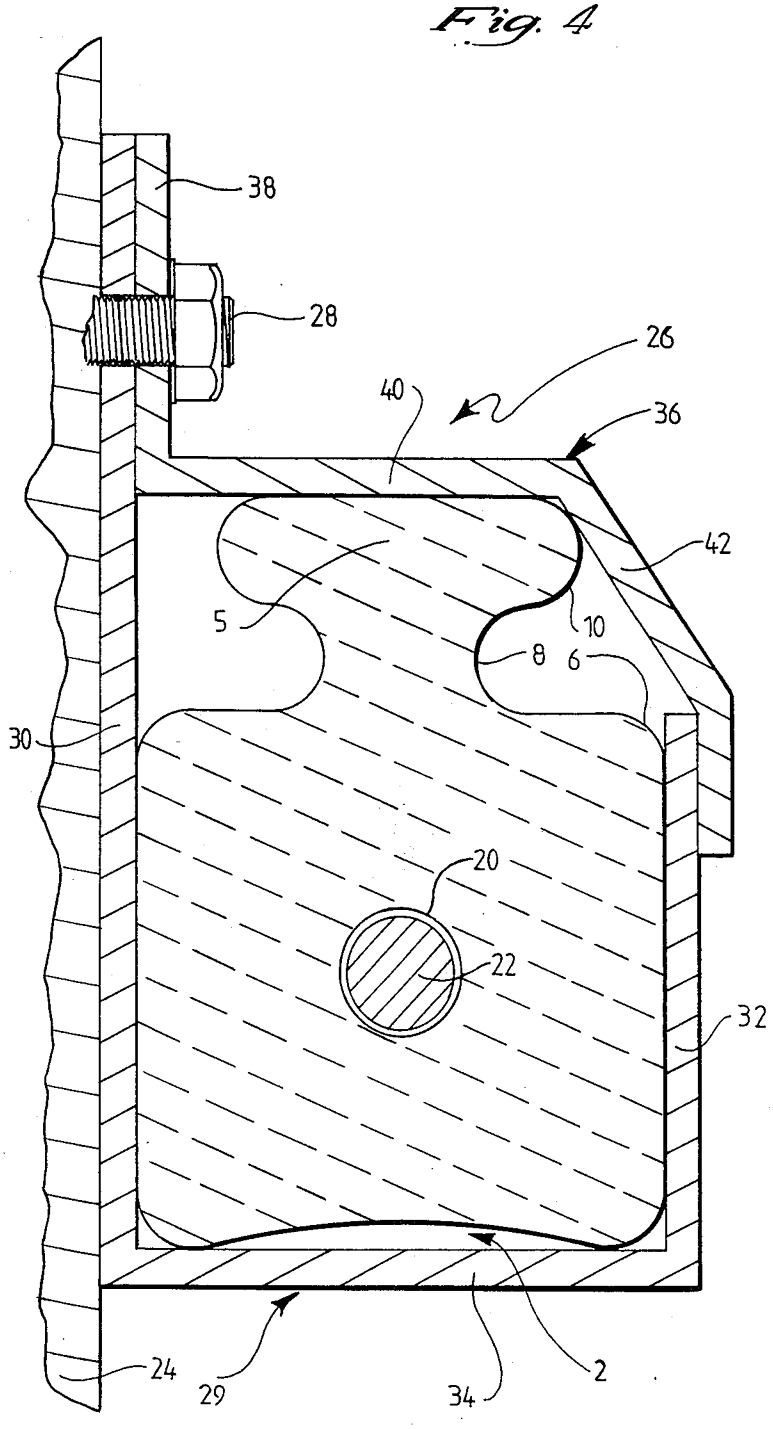
FIG. 4 is a cross-section view along 4—4 of FIG. 3.
Figure 5:
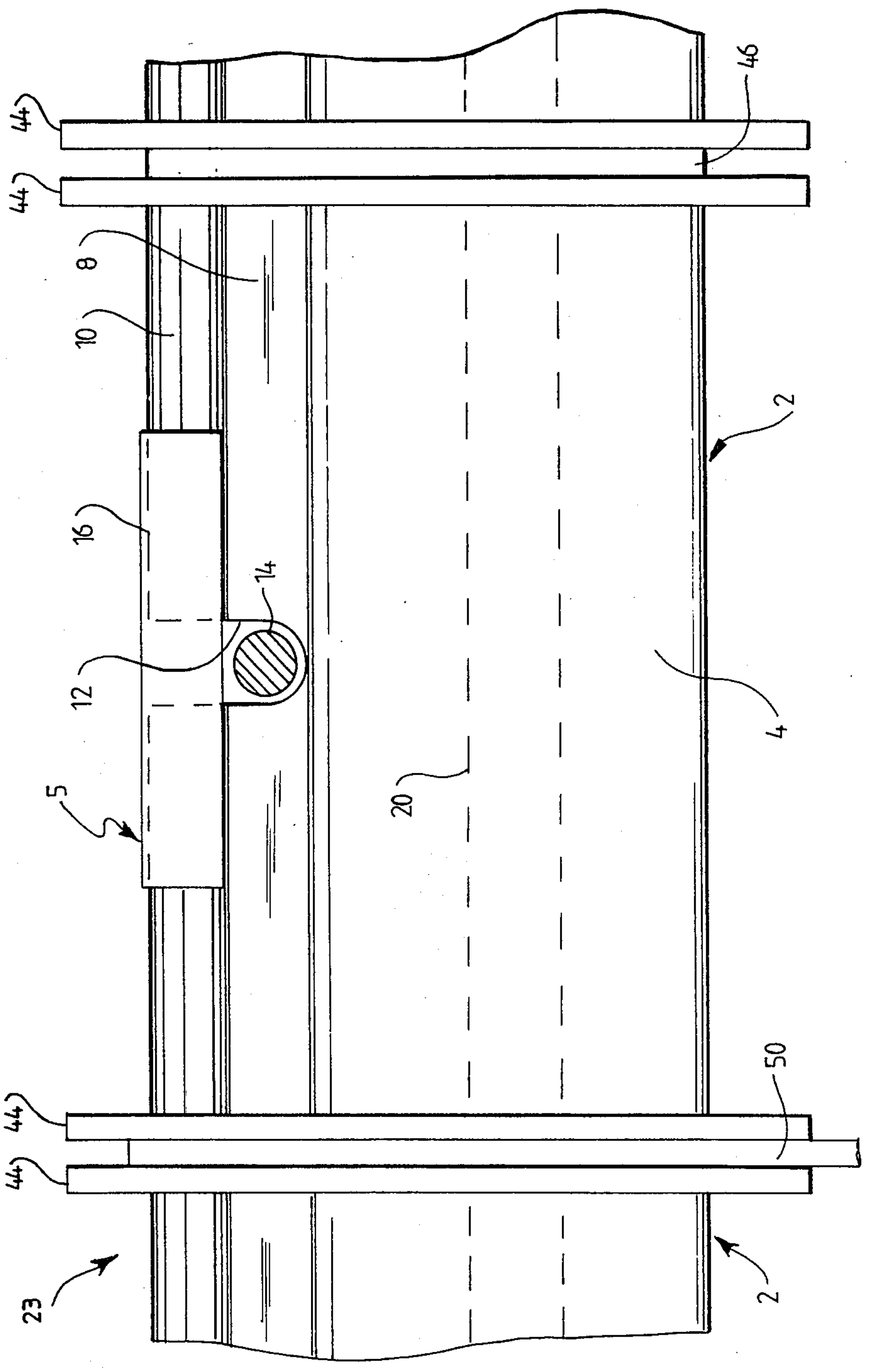
FIG. 5 is a more detailed front view of the block in the cross-arm assembly.

FIGS. 3 to 5 show a cross-arm assembly 23 mounted on a utility pole 24, typically a timber pole of conventional form, by a bracket 26. In assembly of the cross-arm assembly 23, the rod 22 is passed through the aligned bores 20 of the blocks and tensioned by means of tightening nuts 25 so as to apply compressive forces to the blocks so as to retain them in a rigid structure.

Metal plates 52 are located at the free ends of the blocks in the assembly 23 to evenly distribute the load applied by the tensioning rod 22.

The cross-arm assembly 23 includes spacing means including a pair of resilient washers 44 and spacer 46 sandwiched therebetween located between adjacent blocks. The washers and spacers may be formed from rubber or plastic material or material having a surface coating of silicone rubber or sealer. Each washer 44 preferably extends vertically above the place of the upper surfaces of the heads of the blocks so that birds or workman are unlikely to inadvertently contact two adjacent conductors so as to create a short circuit and thereby damage or otherwise disrupt the power supply or conductors or pole assembly. Also, each washer 44 preferably extends below the lower surfaces of the blocks.

One form of the bracket 26 is shown in FIG. 4 and comprises a first portion 29 which is generally U-shaped in cross section and has one arm 30 substantially longer than and interconnected to the other arm 32 by a web portion 34 extending substantially at a right angle from the pole. In use, the cross-arm assembly 23 is located in the first portion of the bracket with the central block snugly engaged by the arms 30 and 32 and web portion 34. A second portion 36 of the bracket has a first flange portion 38 which abuts, in use, against the upper end of arm 30 of the bracket portion 29. The second portion 36 includes a top flange portion 40 arranged at a right angle to first portion 38 for contacting the upper surface of the head portion 5 of the block 2 and an inclined side portion 42 which engages the upper end of the shorter arm 32 of the first portion 29 of the bracket to thereby define a substantially enclosed loop surrounding the block 2. Thus, the cross-arm assembly 23, in accordance with the present invention, is clamped within the bracket 26 and the bracket is secured to the top of the pole by the bolt and nut assembly 28 as shown in FIG. 4.

A pair of forestays 48 are optionally provided to further secure the cross-arm assembly 23 against pivotal movement relative to the pole 24. The lower ends 49 of the stays are secured to the pole 24 and extend from the pole to the cross-arm. The cross-arm is provided with mounting plates 50 which depend downwardly therefrom and which are clamped between adjacent blocks 2. The mounting plates preferably replace the spacers 46 at the selected locations for connection to the stays 48.

In another embodiment, rear stays (not shown) are located on the opposite side of pole 24 to forestays 48 and extend from the pole 24 to the cross-arm 23 in a manner similar to forestays 48 and plates 50. The rear stays are substantially in the common plane of blocks 2 forming the cross-arm assembly 23 to prevent twisting or rotation of the cross-arm about the central longitudinally extending axis of the pole.

In one embodiment the block is 300 mm long, 100 mm in height and 90 mm wide.

Those skilled in the art will appreciate that the invention described herein is susceptible to variations and modifications other than those specifically described. It is to be understood that the invention includes all such variations and modifications which fall within its spirit and scope. For instance, each block may include two or more grooves 12 for receiving conductors.

What is claimed is:

1. A utility pole assembly, said assembly comprising: a utility pole, a cross-arm, a bracket connecting the cross-arm to the pole and a pair of stays which extend from the pole to spaced locations on the cross-arm, said cross-arm comprising a plurality of ceramic elements each including a bore therethrough, said elements being arranged so that their bores are aligned, said cross-arm including spacing means located between adjacent elements, each spacing means having openings therethrough, said cross-arm further including a tension member which passes through said bores and said openings and clamps said elements together, and wherein each element comprises a body having a top portion with conductor support means for supporting an electrical conductor which in use extends transversely relative to the cross-arm, said bracket having an opening therein which is generally complementary in shape to the body so that the cross-arm can extend therethrough and be firmly clamped by the bracket to the pole.

2. A utility pole assembly as claimed in claim 1, wherein the underside of each element includes a shallow concave recess which extends in the longitudinal direction of the cross-arm.

3. A utility pole assembly as claimed in claim 1 wherein each body is generally cuboidal in shape.

4. A utility pole assembly as claimed in claim 3 wherein each conductor support means includes a recess which extends transversely relative to the longest dimension of the body and wherein, in use, a conductor is located in the recess.

5. A utility pole assembly as claimed in claim 4 wherein each recess is open to the upper surface of the top portion and the conductor support means includes a clip which is resiliently engageable with the top portion and operates in use to hold a conductor captive in the recess.

6. A utility pole assembly as claimed in claim 5 wherein the top portion includes a rounded head and the clip is slidable along the head.

7. A utility pole assembly as claimed in claim 1 wherein each spacing means comprises a pair of resilient washers and a spacing element sandwiched therebetween, the tension member passing through the washers and spacing element.

8. A utility pole assembly as claimed in claim 7 wherein said washers project above and below the top and bottom surfaces of the elements of the cross-arm.

9. A utility pole assembly as claimed in claim 1 wherein each stay is connected to the cross-arm by means of a stay mounting bracket which is clamped between adjacent elements of the cross-arm.

* * * * *